(12) United States Patent
Caveney

(10) Patent No.: US 7,457,505 B2
(45) Date of Patent: Nov. 25, 2008

(54) PATCH CORD MANAGEMENT SYSTEM

(75) Inventor: Jack E Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/776,354

(22) Filed: Jul. 11, 2007

(65) Prior Publication Data
US 2008/0044151 A1 Feb. 21, 2008

Related U.S. Application Data

(63) Continuation of application No. 11/355,586, filed on Feb. 16, 2006, now Pat. No. 7,260,302.

(60) Provisional application No. 60/710,413, filed on Aug. 23, 2005, provisional application No. 60/653,570, filed on Feb. 16, 2005.

(51) Int. Cl.
*G02B 6/00* (2006.01)
(52) U.S. Cl. ..................... 385/135; 385/134
(58) Field of Classification Search ................. 385/134, 385/135
See application file for complete search history.

(56) References Cited

U.S. PATENT DOCUMENTS

| | | | |
|---|---|---|---|
| 4,776,662 A | 10/1988 | Valleix | |
| 5,142,606 A | 8/1992 | Carney et al. | |
| 5,758,002 A | 5/1998 | Walters | |
| 6,256,444 B1 * | 7/2001 | Bechamps et al. | 385/134 |
| 6,289,159 B1 * | 9/2001 | Van Hees et al. | 385/134 |
| 6,384,330 B1 | 5/2002 | Squillante et al. | |
| 6,398,149 B1 | 6/2002 | Hines et al. | |
| 6,468,112 B1 * | 10/2002 | Follingstad et al. | 439/719 |
| 6,487,356 B1 * | 11/2002 | Harrison et al. | 385/135 |
| 6,504,094 B2 | 1/2003 | Woo et al. | |
| 6,546,181 B1 * | 4/2003 | Adapathya et al. | 385/135 |
| 6,553,172 B2 | 4/2003 | Lortie et al. | |
| 6,711,339 B2 * | 3/2004 | Puetz et al. | 385/135 |
| 6,724,970 B2 * | 4/2004 | Adapathya et al. | 385/135 |
| 6,760,531 B1 | 7/2004 | Solheid et al. | |
| 6,768,858 B2 * | 7/2004 | Tinucci et al. | 385/134 |
| 6,796,437 B2 * | 9/2004 | Krampotich et al. | 211/26 |
| 6,819,857 B2 * | 11/2004 | Douglas et al. | 385/135 |
| 7,119,280 B1 * | 10/2006 | Ray et al. | 174/72 A |
| 7,142,764 B2 * | 11/2006 | Allen et al. | 385/135 |

(Continued)

OTHER PUBLICATIONS

Panduit Cable Management Rack Systems Brochure, 12 pages, 2002.

*Primary Examiner*—Frank G Font
*Assistant Examiner*—Ryan Lepisto
(74) *Attorney, Agent, or Firm*—Robert A. McCann; Christopher S. Clancy; James H. Williams

(57) ABSTRACT

A slack loop manager is mountable to a network rack having a left side and a right side. The slack loop manager includes a first plurality of slack spools angled from the left side to the right side of the rack, and a second plurality of slack spools angled from the left side to the right side of the rack. The first plurality of slack spools are substantially parallel to the second plurality of slack spools. A divider is positioned between the first plurality and the second plurality of slack spools.

17 Claims, 11 Drawing Sheets

U.S. PATENT DOCUMENTS

| | | | |
|---|---|---|---|
| 7,171,100 B2 * | 1/2007 | Solheid et al. | 385/135 |
| 7,286,742 B2 * | 10/2007 | Shibata et al. | 385/135 |
| 7,298,951 B2 * | 11/2007 | Smrha et al. | 385/135 |
| 7,349,617 B2 * | 3/2008 | Shibata et al. | 385/137 |
| 7,352,945 B2 * | 4/2008 | Holmberg et al. | 385/135 |
| 2004/0201975 A1 * | 10/2004 | Bravo et al. | 361/826 |
| 2005/0002633 A1 * | 1/2005 | Solheid et al. | 385/135 |
| 2006/0228086 A1 * | 10/2006 | Holmberg et al. | 385/135 |
| 2006/0228087 A1 * | 10/2006 | Bayazit et al. | 385/135 |

* cited by examiner

PATCH CORD MANAGEMENT SYSTEM

CROSS-REFERENCE TO RELATED APPLICATIONS

This application is a continuation of U.S. patent application Ser. No. 11/355,586, filed Feb. 16, 2006, which claims the benefit of U.S. Provisional Patent Application No. 60/710,413, filed Aug. 23, 2005 and U.S. Provisional Patent Application No. 60/653,570, filed Feb. 16, 2005, the subject matter of which is hereby incorporated by reference in its entirety.

BACKGROUND OF THE INVENTION

The present invention is directed to a patch cord management system and, more particularly, a patch cord management system which minimizes the variety of patch cord lengths required and optimizes the routing of patch cords in a network rack or enclosure.

As shown in FIGS. 1 and 2, interconnect configurations are well known in a network rack or enclosure environment. In a preferred interconnect configuration, patch cords are routed from the front of a switch to the front of a patch panel, which is positioned vertically above the switch in the network rack or enclosure. Cables exit the rear of the patch panel and are routed to a server or other telecommunications equipment.

As shown in FIGS. 3 and 4, cross-connect configurations are also well known in a network rack or enclosure environment. In a preferred cross-connect configuration, patch cords are routed from the front of a switch located on a first network rack to the rear of a first patch panel located on a second network rack. Patch cords are routed from the front of the first patch panel to the front of a second patch panel, which is positioned vertically above the first patch panel in the second network rack. Cables exit the rear of the second patch panel and are routed to a server or other telecommunications equipment.

SUMMARY OF THE INVENTION

It is desirable to provide a patch cord management system which minimizes the variety of patch cord lengths required and optimizes the routing of patch cords in a network rack or enclosure.

A slack loop manager is mountable to a network rack having a left side and a right side. The slack loop manager includes a first plurality of slack spools angled from the left side to the right side of the rack, and a second plurality of slack spools angled from the left side to the right side of the rack. The first plurality of slack spools is substantially parallel to the second plurality of slack spools. A divider is positioned between the first plurality and the second plurality of slack spools.

Preferably, the divider is angled from the left side to the right side of the rack, and the divider is substantially parallel to the first plurality and the second plurality of slack spools. Each slack spool includes a cable retainer at its free end.

Preferably, the slack loop manager includes a first plurality and a second plurality of bend radius fingers positioned adjacent the left side of the rack. Each bend radius finger includes a cable retainer at its free end. The slack loop manager also includes a first plurality of guide lines printed thereon. Each of the first plurality of guide lines extends from one of the first plurality of bend radius fingers to one of the first plurality of slack spools to one of the second plurality of bend radius fingers.

Preferably, the slack loop manager includes a third plurality and a fourth plurality of bend radius fingers positioned adjacent the right side of the rack. Each bend radius finger includes a cable retainer at its free end. The slack loop manager also includes a second plurality of guide lines printed thereon. Each of the second plurality of guide lines extends from one of the third plurality of bend radius fingers to one of the second plurality of slack spools to one of the fourth plurality of bend radius fingers.

DETAILED DESCRIPTION OF PREFERRED EMBODIMENTS

Figure 1:
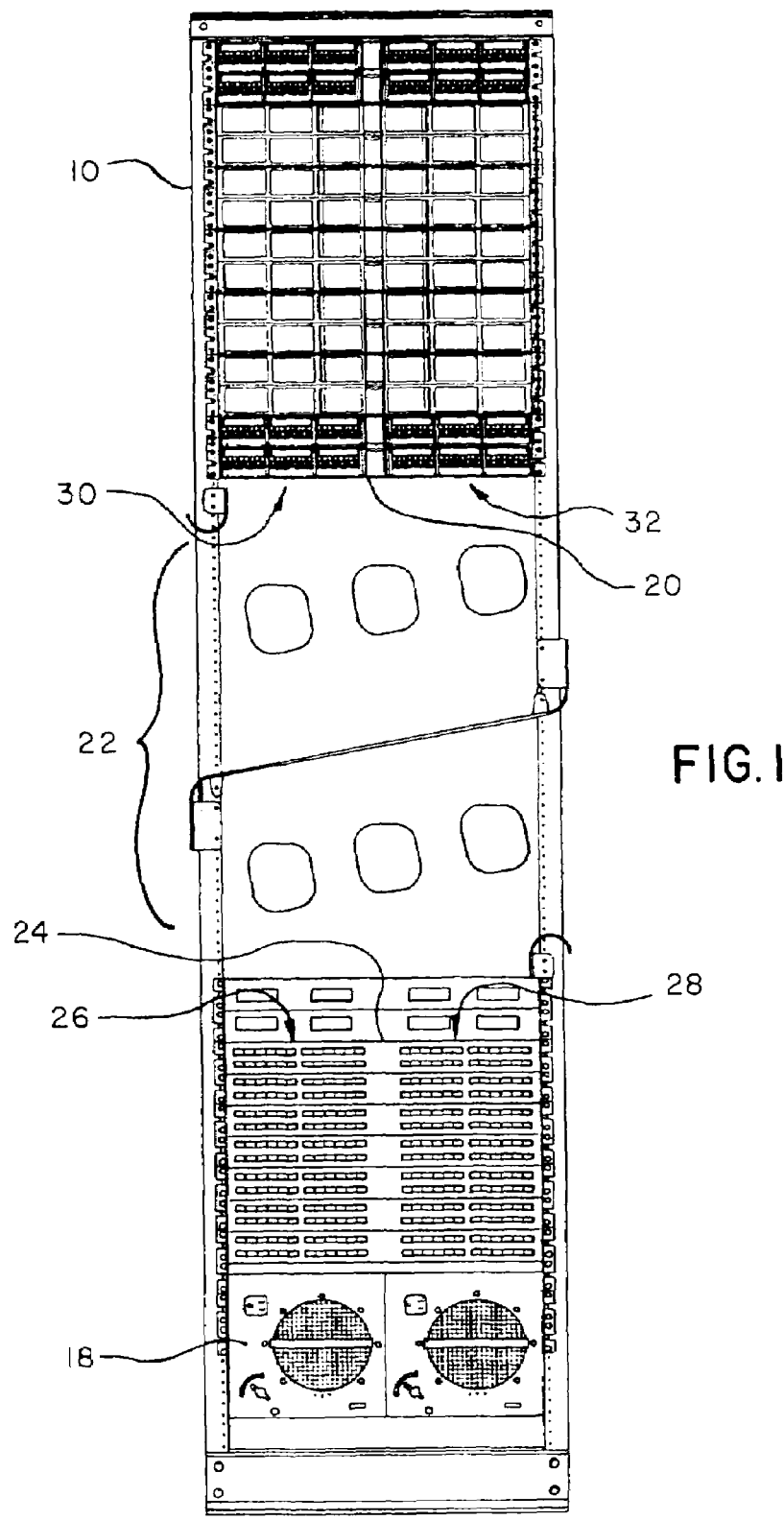
FIG. 1 is a front view of an interconnect configuration in a network rack according to the present invention.
Figure 2:
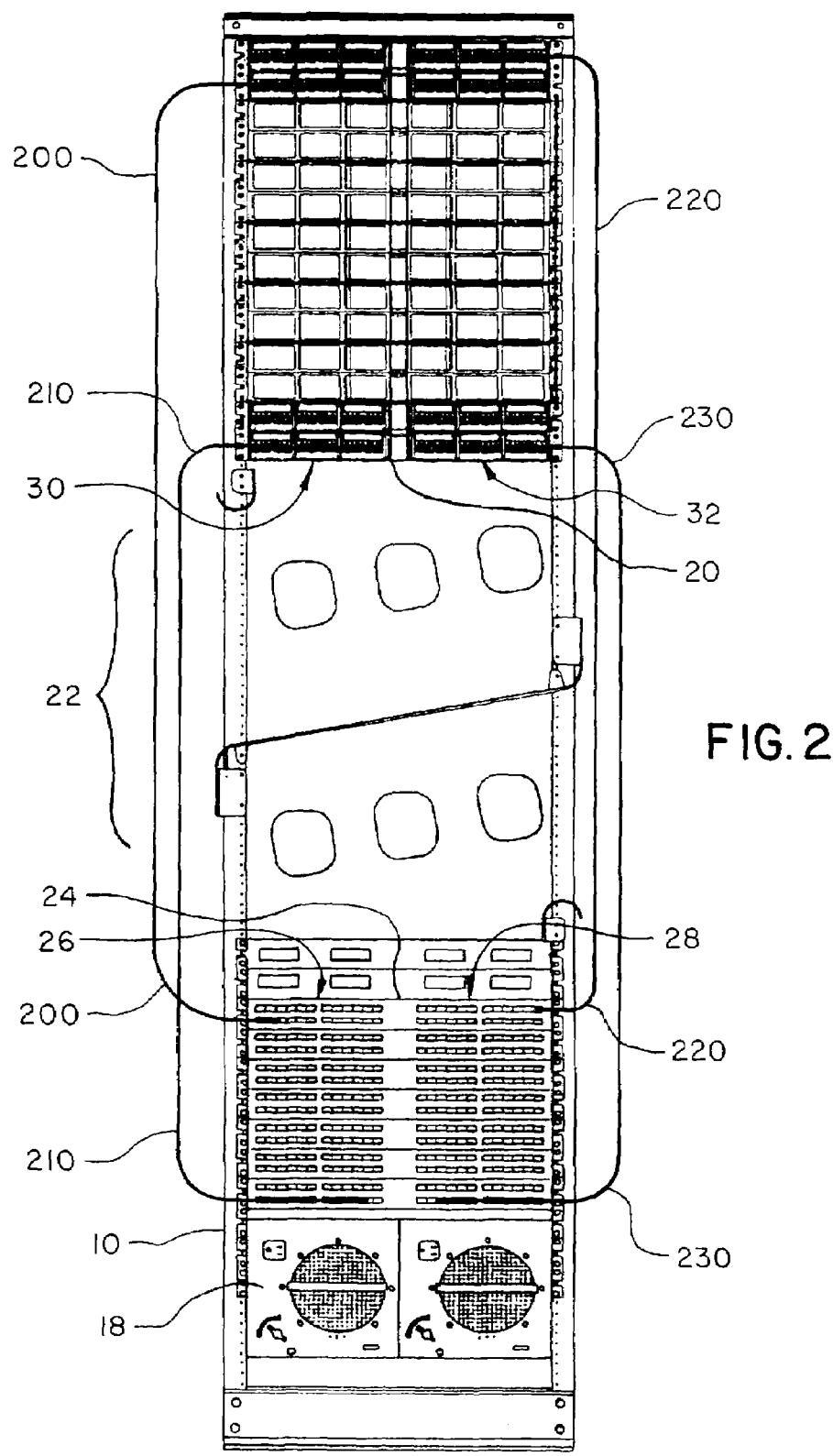
FIG. 2 is a front view similar to FIG. 1, showing exemplary patch cord routing.
Figure 3:
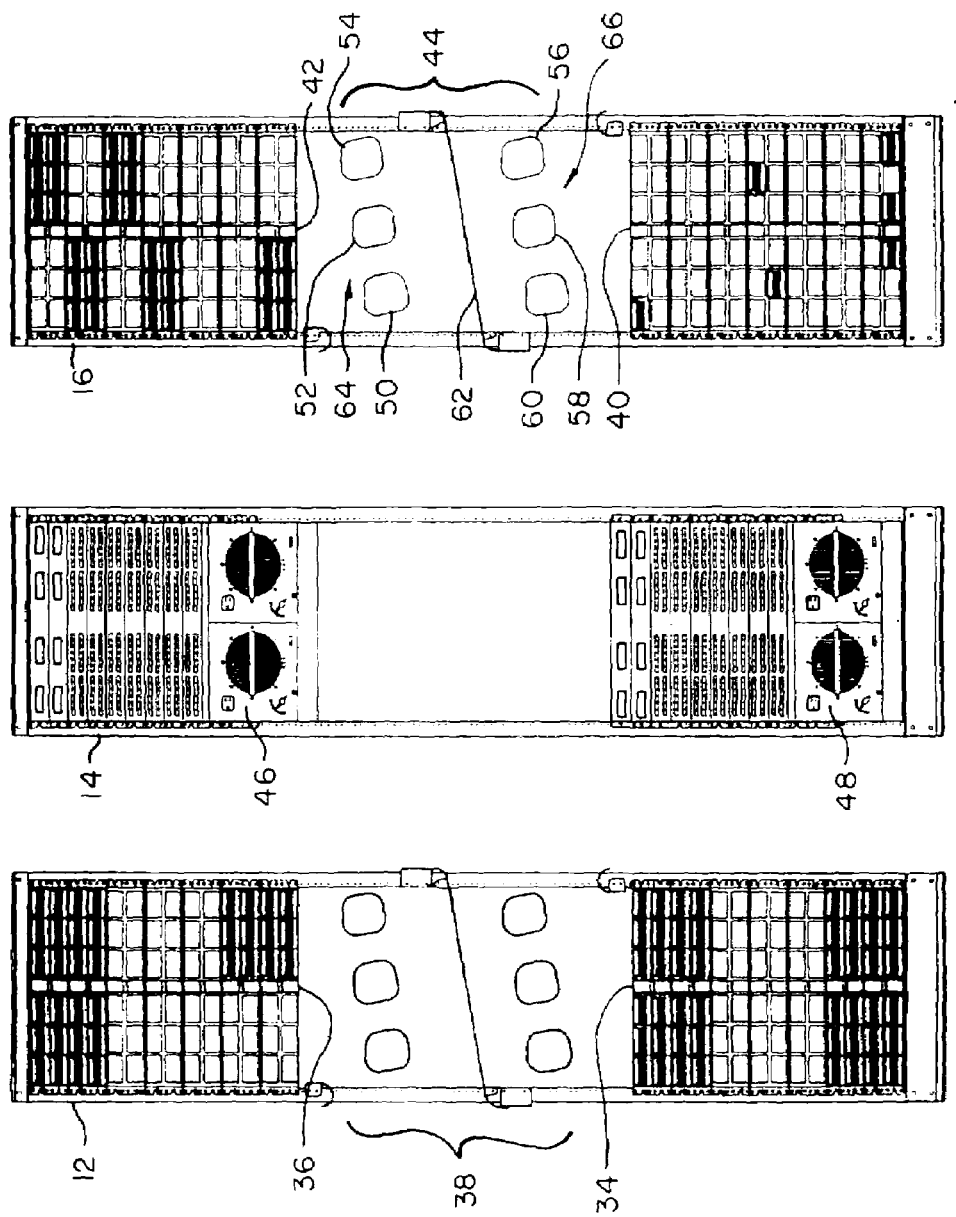
FIG. 3 is a front view of a cross-connect configuration in a row of network racks according to the present invention.
Figure 4:
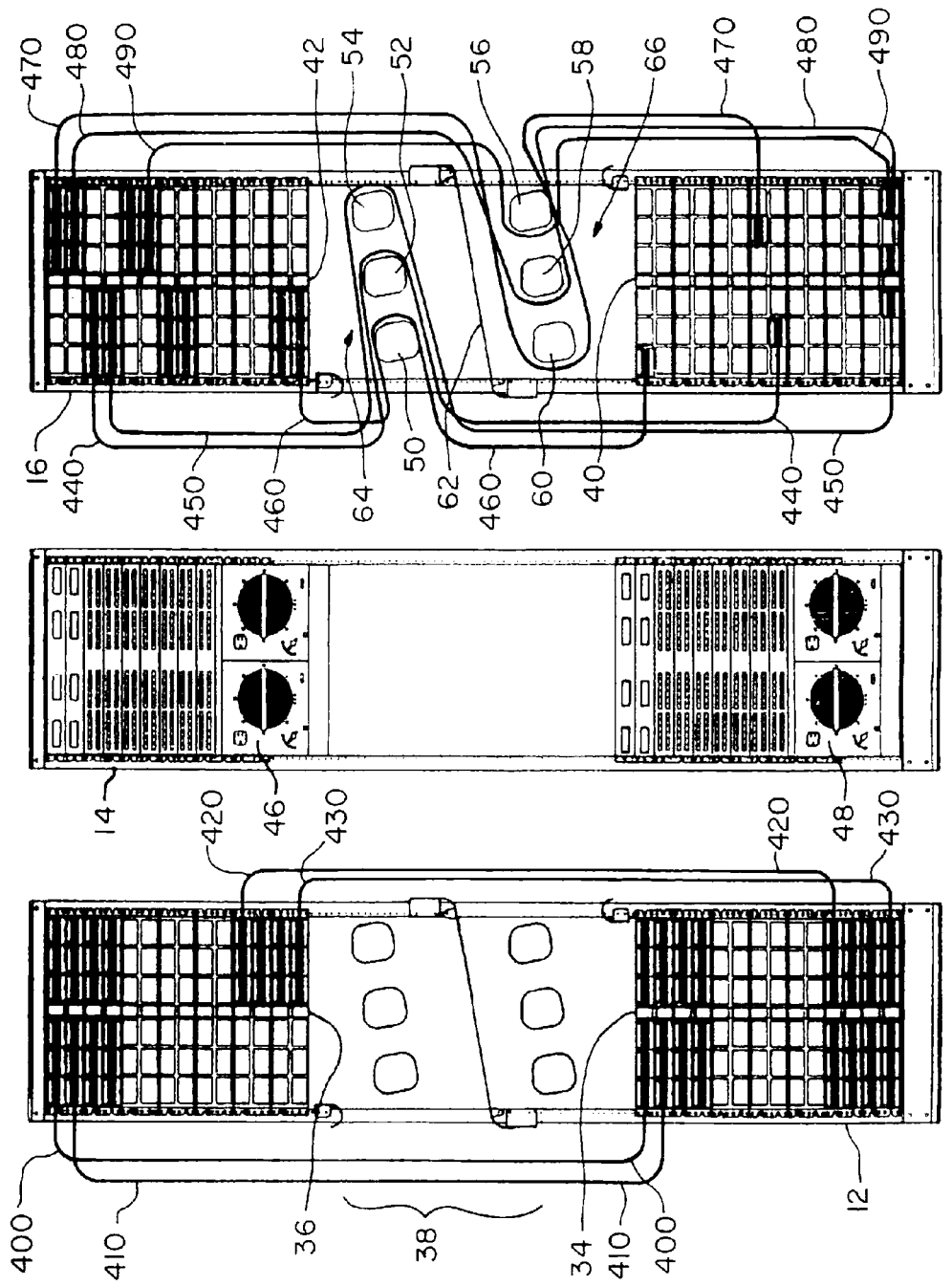
FIG. 4 is a front view similar to FIG. 3, showing exemplary patch cord routing from patch panel to patch panel.

FIGS. 1 and 2 show a front view of an interconnect configuration in a network rack 10, and FIGS. 3 and 4 show a front view of a cross-connect configuration in a row of network racks 12, 14, 16. It is likewise contemplated that the interconnect and cross-connect configurations may be used in a cabinet or other enclosure.

As shown in FIGS. 1 and 2, the interconnect configuration includes a switch 18, an array of patch panels 20 and a horizontal slack loop manager 22 positioned therebetween on network rack 10. In one embodiment, network rack 10 is 45 rack units (RUs) in height, and 1 RU equals 1.75 inches. A typical switch 18 used in this environment is a Cisco 6509 switch that occupies 15 RUs beginning near the base of network rack 10. Switch 18 includes seven interface modules 24, with each module 24 having 48 ports each. Thus, switch 18 has a total of 336 ports.

In order to accommodate patch cords exiting the front of switch 18, an array of patch panels 20 are required, such as the angled patch panel disclosed in U.S. Pat. No. 6,866,541, the entirety of which is incorporated herein by reference. Each of the seven patch panels 20 occupies 2 RUs, and includes 12 faceplates and accommodates a total of 48 connectors. Thus, the array of seven patch panels 20 occupies a total of 14 RUs beginning near the top of network rack 10 and accommodates 336 connectors. Although patch panels which provide 24 ports in one rack unit are shown, it is likewise contemplated that high density patch panels which provide 48 ports in one rack unit may be used.

FIG. 2 shows an optimal patch cord interconnect configuration which includes standard 7-foot patch cords connecting switch 18 to the array of patch panels 20. As shown in FIG. 2, switch 18 is divided into left and right sides 26, 28, respectively. Likewise, each patch panel 20 is divided into left and right sides 30, 32, respectively.

Figure 2A:
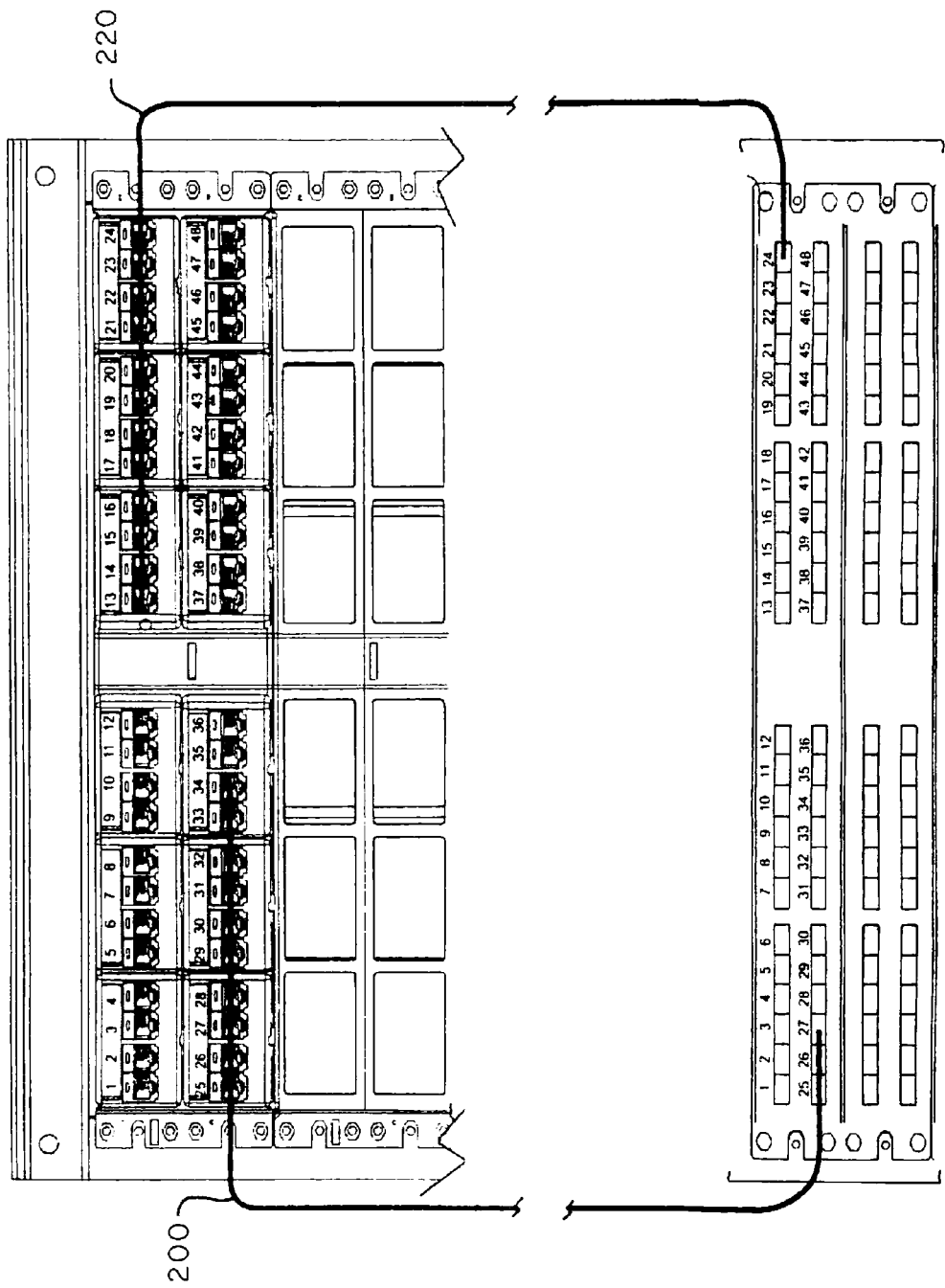
FIG. 2a is a partial exploded view of FIG. 2, showing patch cord paths 200 and 220.
Figure 2B:
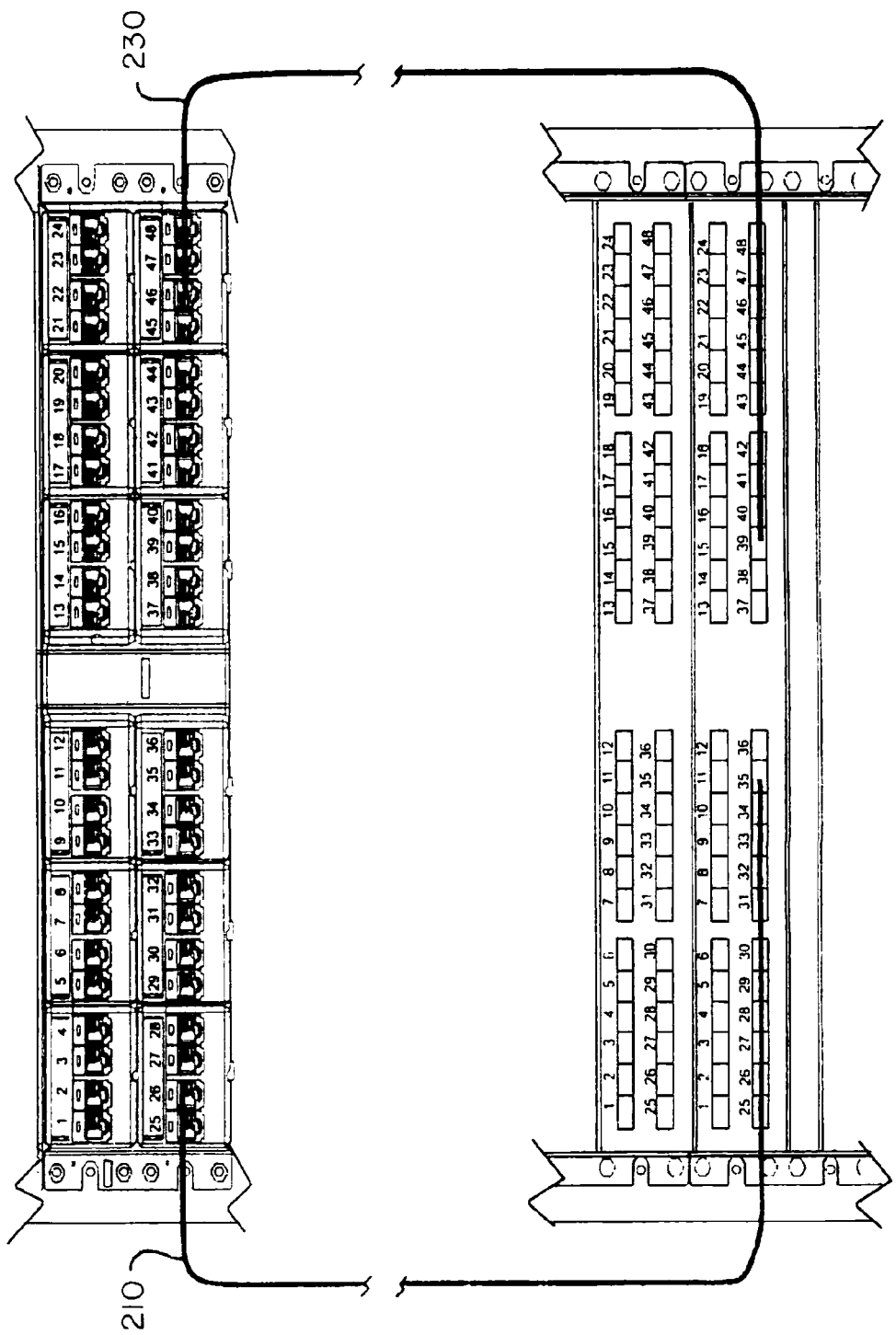
FIG. 2b is a partial exploded view of FIG. 2, showing patch cord paths 210 and 230.

For ease of reference, the switch ports and the patch panel ports will be assigned numbers that will be referenced below. For example, left side 26 of module 24 has 24 ports, with ports 1-6 comprising an upper left quadrant, ports 7-12 comprising an upper right quadrant, ports 25-30 comprising a lower left quadrant, and ports 31-36 comprising a lower right quadrant, as shown in FIGS. 2a and 2b. Similarly, right side 28 of module 24 has 24 ports, with ports 13-18 comprising an upper left quadrant, ports 19-24 comprising an upper right quadrant, ports 37-42 comprising a lower left quadrant, and ports 43-48 comprising a lower right quadrant. Moreover, left side 30 of patch panel 20 has 24 ports, with ports 1-4, 5-8, and 9-12 comprising the 3 upper faceplates, respectively, and ports 25-28, 29-32 and 33-36 comprising the 3 lower faceplates, respectively, as shown in FIGS. 2a and 2b. Similarly, right side 32 of patch panel 20 has 24 ports, with ports 13-16, 17-20 and 21-24 comprising the 3 upper faceplates, respectively, and ports 37-40, 41-44 and 45-48 comprising the 3 lower faceplates, respectively.

In an optimal interconnect configuration, patch cords exiting the front left side 26 of switch 18 are routed to the front left side 30 of the array of patch panels 20. Similarly, patch cords exiting from the front right side 28 of switch 18 are routed to the front right side 32 of the array of patch panels 20. Preferably, in an optimal interconnect configuration, horizontal slack loop manager 22 is not required. But in real life, such an optimal interconnect configuration is not always possible.

As best seen in FIG. 2a, patch cord path 200 runs from port 27 in the lower left quadrant of top module 24 on left side 26 of switch 18 to port 34 in the lower right faceplate on left side 30 of top patch panel 20. As also shown in FIG. 2a, patch cord path 220 runs from port 24 in the upper right quadrant of top module 24 on right side 28 of switch 18 to port 13 in the upper left faceplate on right side 32 of top patch panel 20. As best seen in FIG. 2b, patch cord path 210 runs from port 35 in the lower right quadrant of bottom module 24 on left side 26 of switch 18 to port 26 in the lower left faceplate on left side 30 of bottom patch panel 20. As also shown in FIG. 2b, patch cord path 230 runs from port 39 in the lower left quadrant of bottom module 24 on right side 28 of switch 18 to port 46 in the lower right faceplate on right side 32 of bottom patch panel 20. Thus, in an optimal interconnect configuration, patch cord paths 200, 210, 220 and 230 have substantially the same patch cord path length. In fact, each patch cord path length is approximately 82 inches. Thus, a standard 7-foot patch cord may be used for all patch cord paths in an optimal interconnect configuration.

As shown in FIGS. 3 and 4, the cross-connect configuration includes three adjacent network racks 12, 14, 16. It is likewise contemplated that the cross-connect configuration may include only two network racks. As shown in FIG. 3, network rack 12 includes a first array of patch panels 34, a second array of patch panels 36 and a first horizontal slack loop manager 38 positioned therebetween. Similarly, network rack 16 includes a third array of patch panels 40, a fourth array of patch panels 42 and a second horizontal slack loop manager 44 positioned therebetween. Network rack 14 is positioned between network rack 12 and network rack 16, and includes two switches 46, 48. A typical switch used in this environment is a Cisco 6509 switch.

As described in the interconnect configuration, each switch is divided into left and right sides. Similarly, each patch panel is divided into left and right sides. Network racks 12, 14, 16 may also include horizontal pathways located at the top and bottom of each rack. These pathways allow patch cords to run from one network rack to another network rack.

Figure 5:
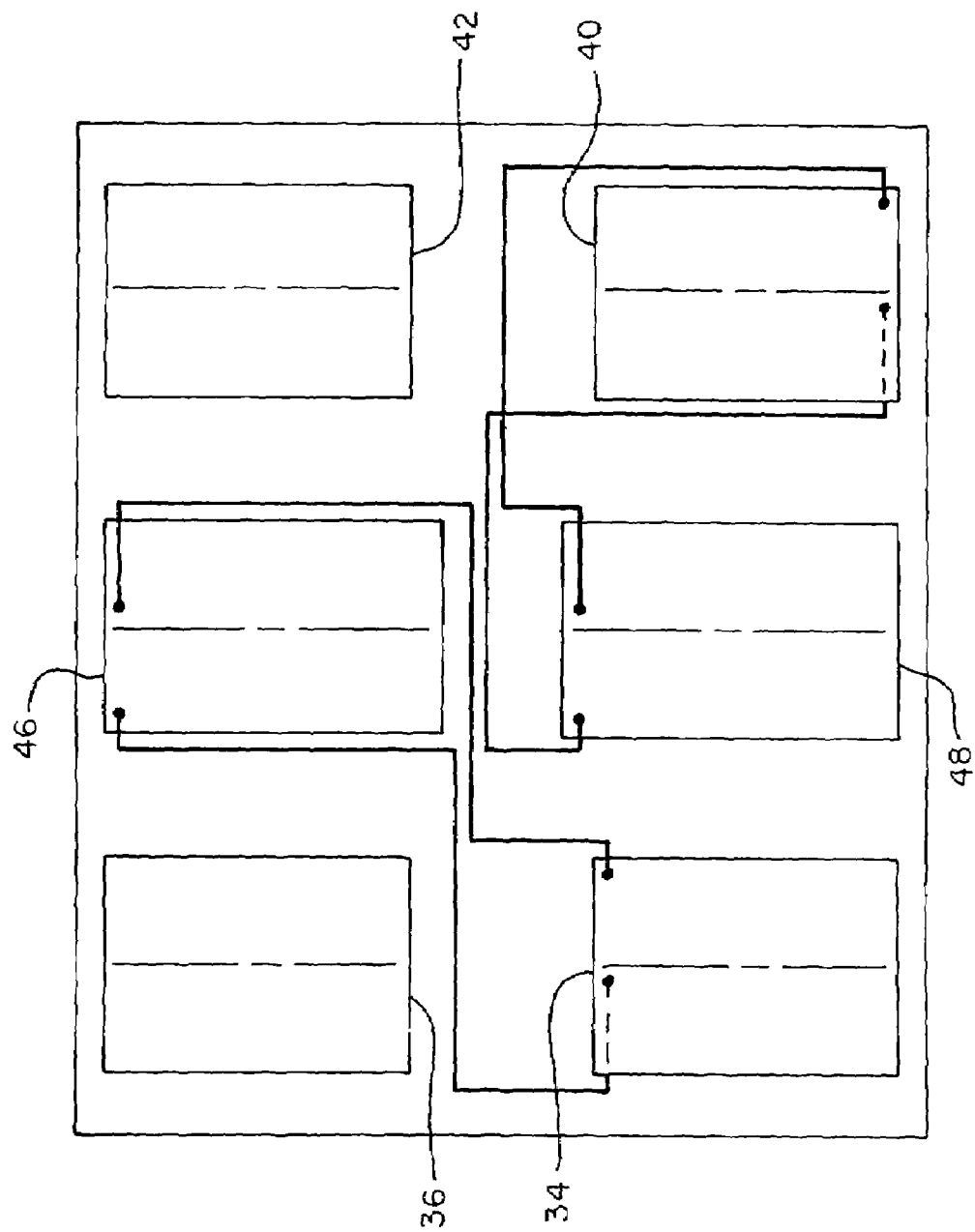
FIG. 5 is a front view of a cross-connect configuration, showing exemplary patch cord routing from switch to patch panel.

In an optimal cross-connect configuration, as shown in FIG. 5, patch cords exiting the front left side of switch 46 are routed to the rear left side of the first array of patch panels 34. As best seen in FIG. 4, patch cords are routed from the front left side of the first array of patch panels 34 to the front left side of the second array of patch panels 36 (see 400 and 410). Similarly, as shown in FIG. 5, patch cords exiting the front right side of switch 46 are routed to the rear right side of the first array of patch panels 34. As best seen in FIG. 4, patch cords are routed from the front right side of the first array of patch panels 34 to the front right side of the second array of patch panels 36 (see 420 and 430). Cables exit the rear left and right sides of the second array of patch panels 36 and are routed to a server or other telecommunications equipment.

As shown in FIG. 5, patch cords exiting the front left side of switch 48 are routed to the rear left side of the third array of patch panels 40. As best seen in FIG. 4, patch cords are routed from the front left side of the third array of patch panels 40 to the front left side of the fourth array of patch panels 42 (see 440, 450 and 460). Similarly, as shown in FIG. 5, patch cords exiting the front right side of switch 48 are routed to the rear right side of the third array of patch panels 40. As best seen in FIG. 4, patch cords are routed from the front right side of the third array of patch panels 40 to the front right side of the fourth array of patch panels 42 (see 470, 480 and 490). Cables exit the rear left and right sides of the fourth array of patch panels 42 and are routed to a server or other telecommunications equipment.

As shown in FIG. 4, patch cord paths 400, 410, 420 and 430 illustrate an optimal cross-connect configuration, similar to the optimal interconnect configuration shown in FIGS. 2, 2a and 2b. Thus, standard 7-foot patch cords may be used for patch cord paths 400, 410, 420 and 430 on the front of the network racks. Also, because of the specific cabling configuration shown in FIG. 5, the patch cord path lengths are substantially the same from switches 46, 48 to the first array of patch panels 34 and the third array of patch panels 40, respectively.

While the optimal cross-connect configuration allows for the use of one size patch cord on the front of the network racks and no slack management, there may be modifications or revisions required that mandate longer patch cords. Network rack 16 shows a cross-connect configuration after some of the connections have been reconfigured, which also requires reconfiguration of the corresponding patch cords. For example, in an optimal interconnect configuration, patch cord path 440 would run from port 31 on the lower middle faceplate on the left side of the fourth row in the third array of patch panels 40 to port 30 in the lower middle faceplate on the left side of the fourth row in the fourth array of patch panels 42. However, after reconfiguration, patch cord path 440 runs to port 7 in the upper middle faceplate on the left side of the second row in the fourth array of patch panels 42.

Patch cord paths 440, 450, 470, 480 and 490 are longer than in their optimal configuration. As a result, standard 7-foot patch cords may need to be replaced with longer patch cords. In fact, the maximum patch cord path after reconfiguration is approximately 117 inches. Thus, a 10-foot patch cord may be used for all patch cord paths after reconfiguration. Even though patch cord path 460 is shorter than in its optimal configuration, horizontal slack loop manager 44 may be required to manage excess patch cord length, even for a standard 7-foot patch cord. Accordingly, regardless of whether the reconfigured patch cord path is shorter or longer than in its optimal configuration, horizontal slack loop manager 44 can be utilized to manage excess patch cord length. In addition or alternatively, slack loop managers can be incorporated in vertical cable managers.

Figure 6:
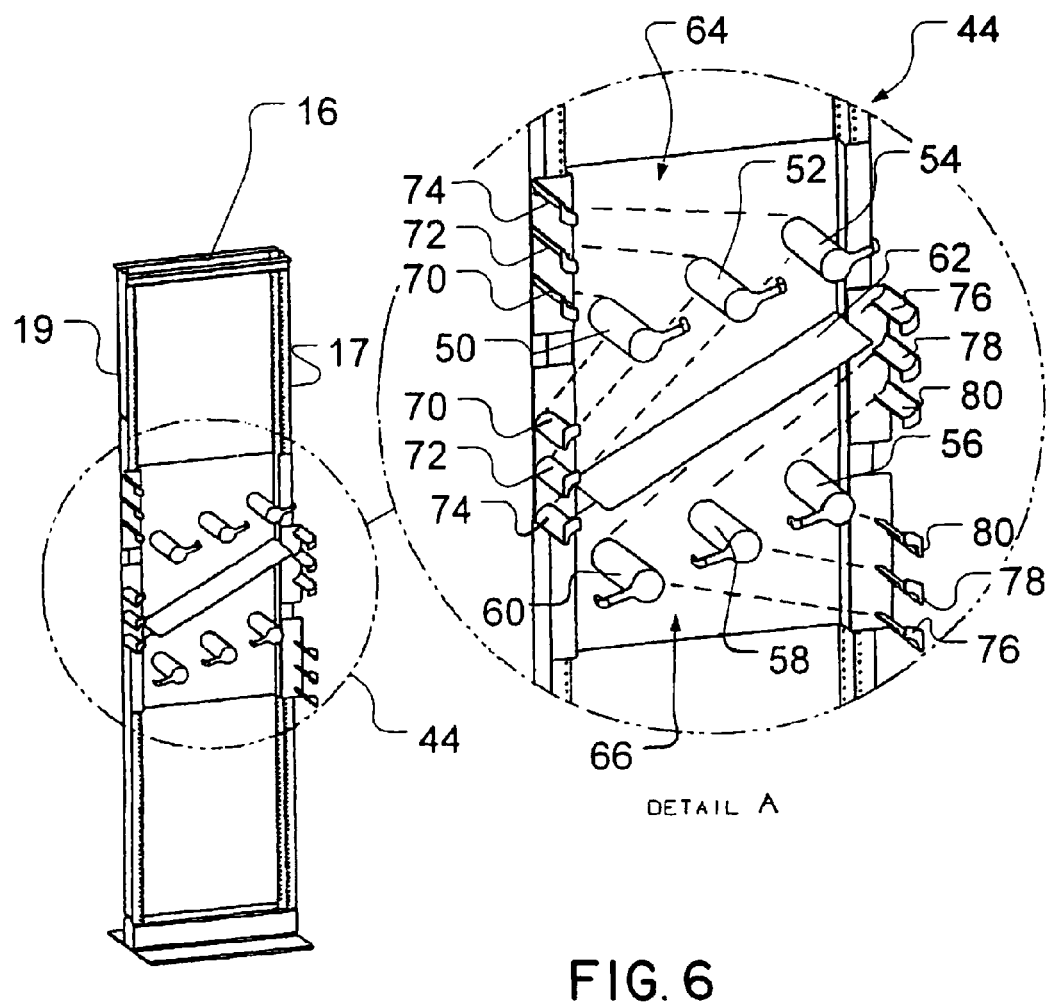
FIG. 6 is a perspective view of a standing network rack including a horizontal slack loop manager.
Figure 7:
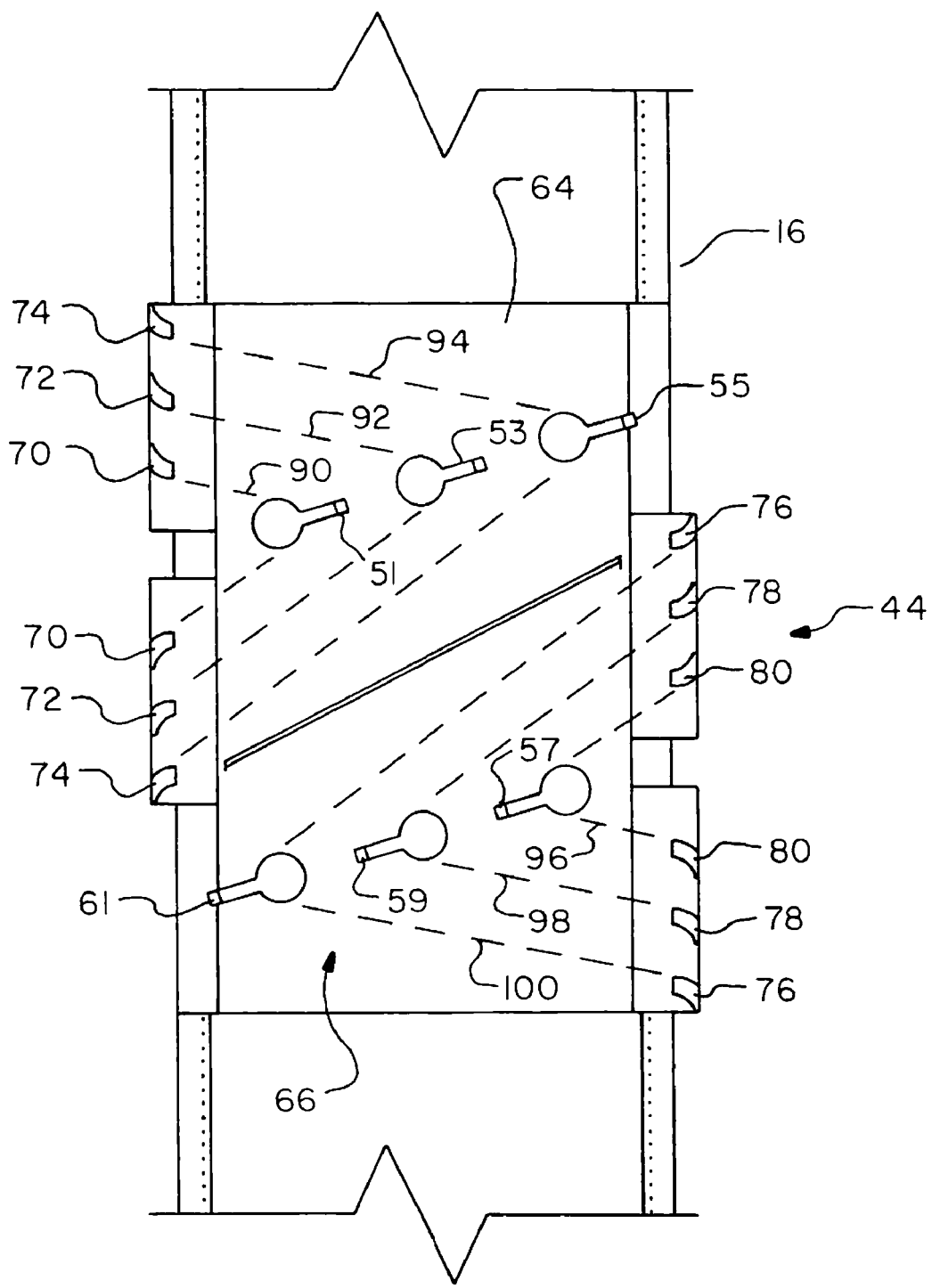
FIG. 7 is a front view of the horizontal slack loop manager of FIG. 6.
Figure 8:
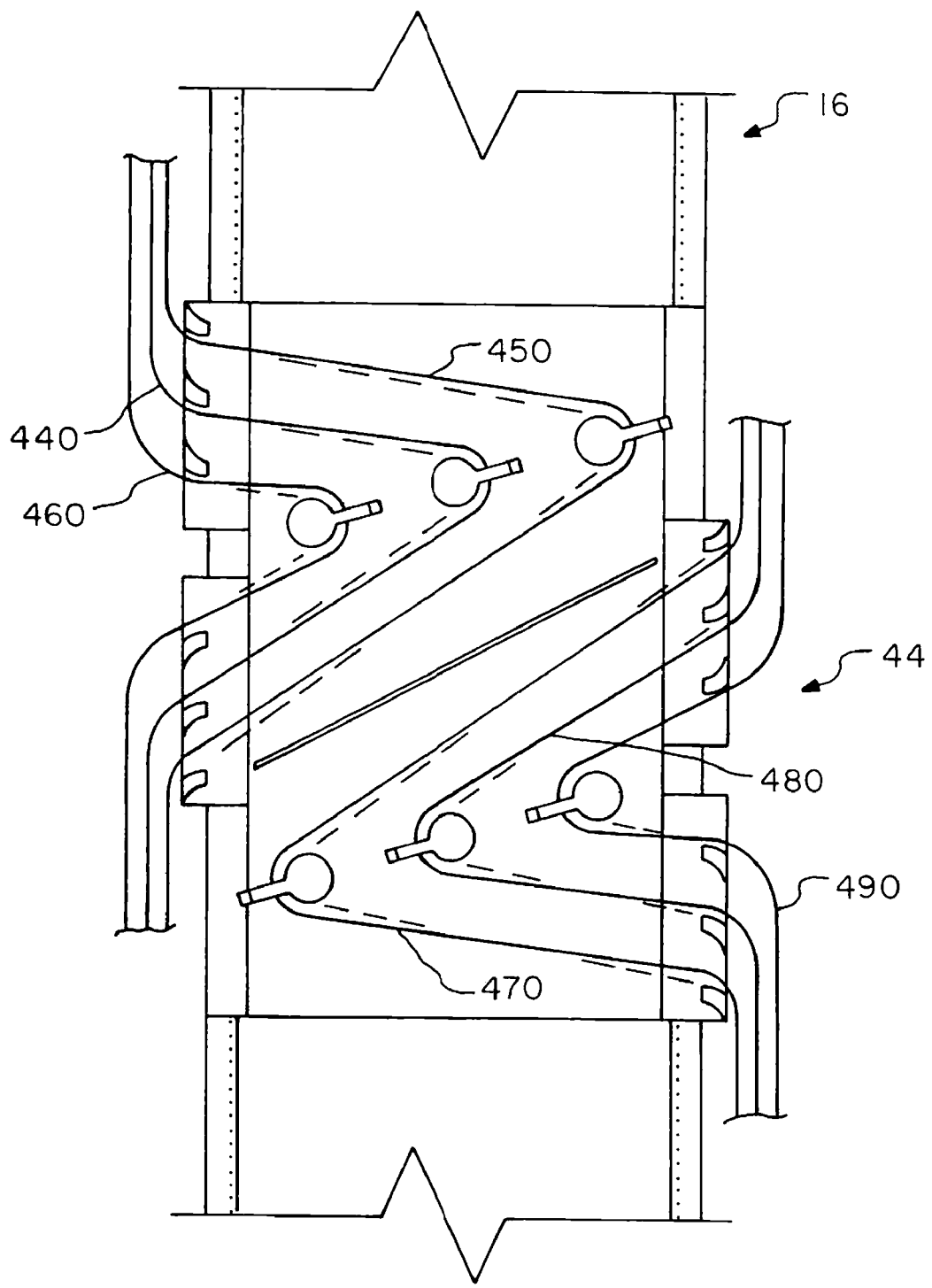
FIG. 8 is a front view of the horizontal slack loop manager of FIG. 6, including routed cables.

Referring to FIGS. 6-8, horizontal slack loop manager 44 on network rack 16 includes a first plurality of slack spools 50, 52, 54, a second plurality of slack spools 56, 58, 60 and a divider 62 positioned therebetween. Preferably, divider 62 is angled downward from one side 17 of network rack 16 to the other side 19 of network rack 16. Moreover, the first and second plurality of slack spools 50, 52, 54, 56, 58, 60 are also angled downward from one side 17 of network rack 16 to the other side 19 of network rack 16. Preferably, the first and second plurality of slack spools 50, 52, 54, 56, 58, 60 are substantially parallel to divider 62.

As shown in FIG. 8, the first plurality of slack spools 50, 52, 54 organizes patch cords along paths 440, 450 and 460, and the second plurality of slack spools 56, 58, 60 organizes patch cords along paths 470, 480, and 490. Preferably, a first slack control area 64 (see FIGS. 6 and 7) is defined by the first plurality of slack spools 50, 52, 54 and is wider near the left side 19 of network rack 16. Typically, first slack spool 50 manages more patch cords than second and third slack spools 52, 54, respectively, and second slack spool 52 manages more patch cords than third slack spool 54. Similarly, a second slack control area 66 (see FIGS. 6 and 7) is defined by the second plurality of slack spools 56, 58, 60 and is wider near the right side 17 of network rack 16. Typically, fourth slack spool 56 manages more patch cords than fifth and sixth slack spools 58, 60, respectively, and fifth slack spool 58 manages more patch cords than sixth slack spool 60. Each slack spool 50, 52, 54, 56, 58, and 60 may further include a cable retainer 51, 53, 55, 57, 59, and 61, respectively, to prevent the patch cords from slipping off their respective slack spools.

Although the first plurality of slack spools shown in FIGS. 6-8 includes three slack spools 50, 52, 54, it is likewise contemplated that the first plurality of slack spools may include any number of slack spools. Similarly, although the second plurality of slack spools includes three slack spools 56, 58, 60, it is contemplated that the second plurality of slack spools may include any number of slack spools.

The horizontal slack loop manager 44 further includes a plurality of bend radius fingers 70, 72, 74, 76, 78, and 80 mounted onto its edges along the lateral sides of network rack 16. Each bend radius finger may include a cable retainer at its free end to prevent the patch cords from slipping off their respective fingers. The bend radius fingers prevent the crossing of cables by aligning one cable onto its respective slack spool at a time. As shown in FIG. 7, guide lines 90, 92, 94, 96, 98 and 100 are printed onto the first and second slack control areas 64 and 66, respectively, of horizontal slack loop manager 44 to further assist in the prevention of cable-crossing. A patch cord follows the path of one printed guide line. For example, a cord follows the path of guide line 90. Guide line 90 is associated with one slack spool 50 and one bend radius finger 70. The patch cord is then pulled taut around the slack spool 50 and no slack remains.

Figure 9:
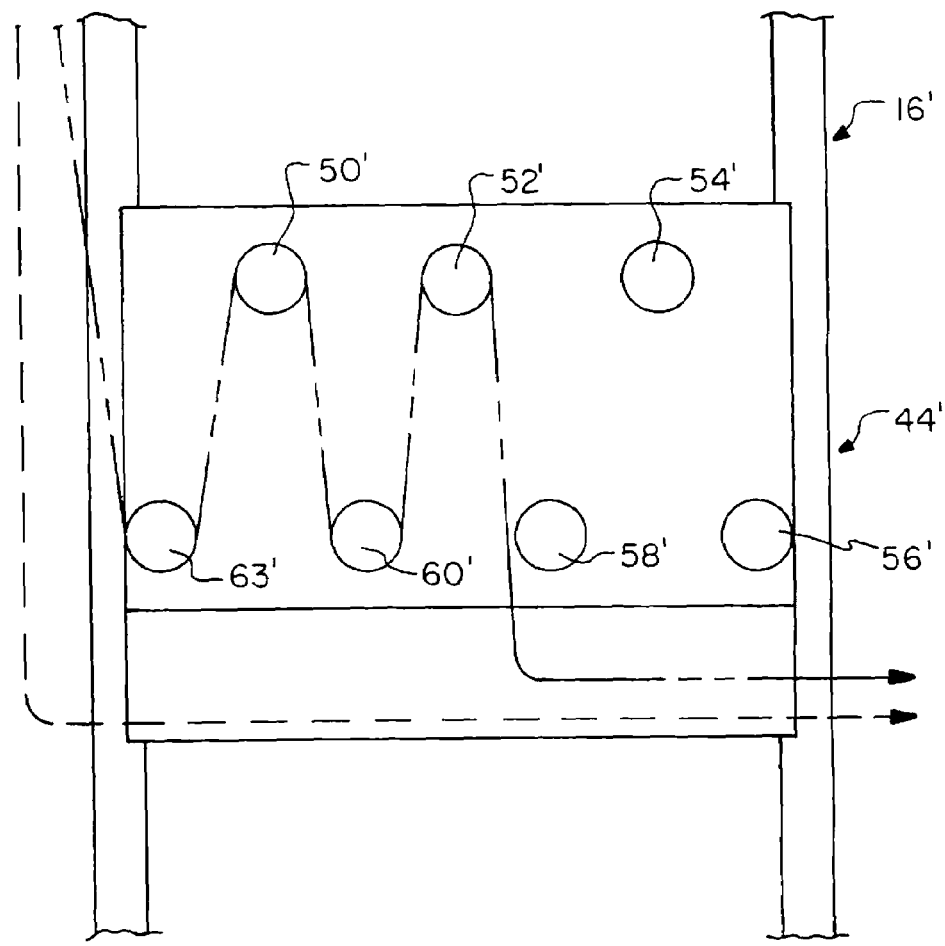
FIG. 9 is a front view of an alternate embodiment of a horizontal slack loop manager.

FIG. 9 illustrates another embodiment of a horizontal slack loop manager 44'. In this embodiment, an upper plurality of slack spools 50', 52', 54' is positioned above a lower plurality of slack spools 56', 58', 60' and 63'. Both sets of slack spools are positioned perpendicular to one side of network rack 16' instead of at an angle. The patch cord is routed around as many spools as required, alternating between an upper slack spool and a lower slack spool in a "sine-wave" pattern, until no slack remains. Although horizontal slack loop manager 44' does not occupy as many rack units on the rack 16', it accommodates less patch cords than horizontal slack loop manager 44.

The disclosed invention provides a patch cord management system which minimizes the variety of patch cord lengths required and optimizes the routing of patch cords in a network rack or enclosure.

It should be noted that the above-described illustrated embodiments and preferred embodiments of the invention are not an exhaustive listing of the form such a patch cord management system in accordance with the invention might take; rather, they serve as exemplary and illustrative of embodiments of the invention as presently understood. Many other forms of the invention are believed to exist.

The invention claimed is:

1. A slack loop manager for a network rack, said slack loop manager comprising:
    a first plurality of slack spools,
        wherein said first plurality of slack spools are arranged in a line, and
        wherein said line is oblique to at least one side of said network rack;
    a second plurality of slack spools,
        wherein said second plurality of slack spools is substantially parallel to said first plurality of slack spools; and
    a divider,
        wherein said divider is positioned between said first plurality of slack spools and said second plurality of slack spools.

2. The slack loop manager of claim 1, wherein said first plurality of slack spools comprises three slack spools.

3. The slack loop manager of claim 1, wherein each slack spool comprises a cable retainer at a free end.

4. The slack loop manager of claim 1, further including a first plurality of bend radius fingers associated with said first plurality of slack spools.

5. The slack loop manager of claim 4, wherein said first plurality of bend radius fingers comprises three bend radius fingers.

6. The slack loop manager of claim 4, wherein each bend radius finger comprises a cable retainer at a free end.

7. The slack loop manager of claim 4, further comprising a first plurality of guide lines extending from one of said first plurality of bend radius fingers to one of said first plurality of slack spools to another of said first plurality of bend radius fingers.

8. The slack loop manager of claim 1, wherein said first plurality of slack spools comprises three slack spools and said second plurality of slack spools comprises three slack spools.

9. The slack loop manager of claim 1, wherein each slack spool comprises a cable retainer at a free end.

10. The slack loop manager of claim 1, further comprising a first plurality of bend radius fingers associated with said first plurality of slack spools and a second plurality of bend radius fingers associated with said second plurality of slack spools.

11. The slack loop manager of claim 10, wherein each bend radius finger comprises a cable retainer at a free end.

12. The slack loop manager of claim 10, further comprising a first plurality of guide lines extending from one of said first plurality of bend radius fingers to one of said first plurality of slack spools to another of said first plurality of bend radius fingers and a second plurality of guide lines extending from one of said second plurality of bend radius fingers to one of said second plurality of slack spools to another of said second, plurality of guide lines.

13. The slack loop manager of claim 1, wherein said divider is substantially parallel to said first plurality of slack spools and said second plurality of slack spools.

14. A method for managing a slack loop in a network rack, said method comprising:
   providing a first plurality of slack spools,
      wherein said first plurality of slack spools are arranged in a line, and
      wherein said line is oblique to at least one side of said network rack;
   providing a second plurality of slack spools,
      wherein said second plurality of slack spools is substantially parallel to said first plurality of slack spools; and
   providing a divider,
      wherein said divider is positioned between said first plurality of slack spools and said second plurality of slack spools.

15. The method of claim 14, further comprising providing a first plurality of bend radius fingers associated with said first plurality of slack spools and a second plurality of bend radius fingers associated with said second plurality of slack spools.

16. The method of claim 15, further comprising providing a first plurality of guide lines extending from one of said first plurality of bend radius fingers to one of said first plurality of slack spools to another of said first plurality of bend radius fingers and a second plurality of guide lines extending from one of said second plurality of bend radius fingers to one of said second plurality of slack spools to another of said second plurality of guide lines.

17. The method of claim 14, wherein said divider is substantially parallel to said first plurality of slack spools and said second plurality of slack spools.

* * * * *